United States Patent [19]

Johnson

[11] Patent Number: 4,519,903
[45] Date of Patent: May 28, 1985

[54] FILTER MACHINE

[76] Inventor: Willard L. Johnson, 12923 Lincoln Rd., Huntington Woods, Mich. 48070

[21] Appl. No.: 460,288

[22] Filed: Jan. 24, 1983

[51] Int. Cl.³ .............................................. B01D 25/02
[52] U.S. Cl. ..................................... 210/94; 210/307; 210/314; 210/340; 210/346
[58] Field of Search ............... 210/298, 314, 340, 346, 210/94, 307, 347

[56] References Cited

U.S. PATENT DOCUMENTS

| | | | |
|---|---|---|---|
| 2,013,776 | 9/1935 | Weisman | 210/314 X |
| 3,559,809 | 2/1971 | Barmore | 210/340 X |
| 3,623,614 | 11/1971 | Schmidt | 210/340 X |
| 3,635,343 | 1/1972 | Holland | 210/298 X |

Primary Examiner—Thomas Wyse
Attorney, Agent, or Firm—Basile, Weintraub & Hanlon

[57] ABSTRACT

In a suction-type filter machine, a plurality of filter leaves each haing a core panel of egg-crate type walls defining transverse passageways through said panel and openings through said walls to provide vertical, horizontal and longitudinal passageways for filtrate flow drawn by a suction pump through the filter medium enwrapping the core panel and a conduit conductor enclosing an edge portion of the core panel.

20 Claims, 12 Drawing Figures

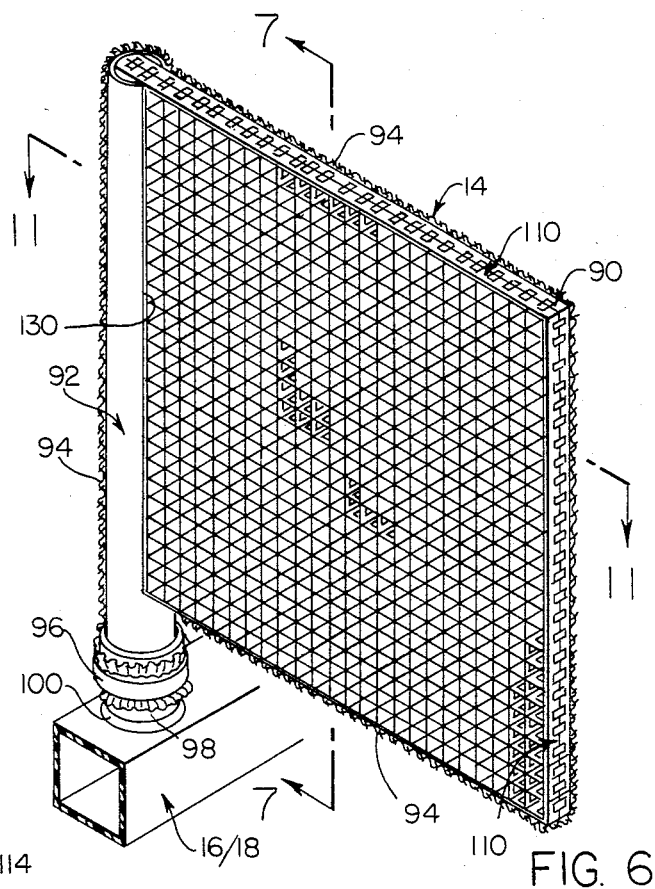
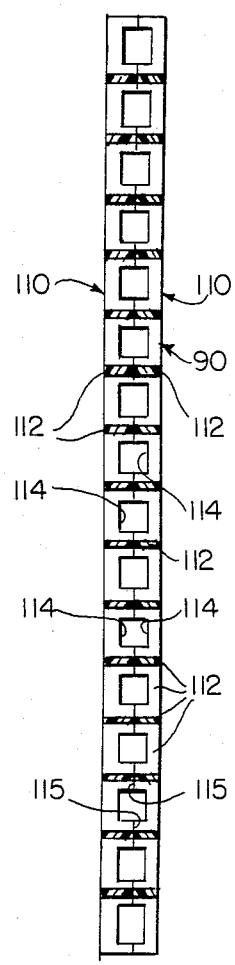
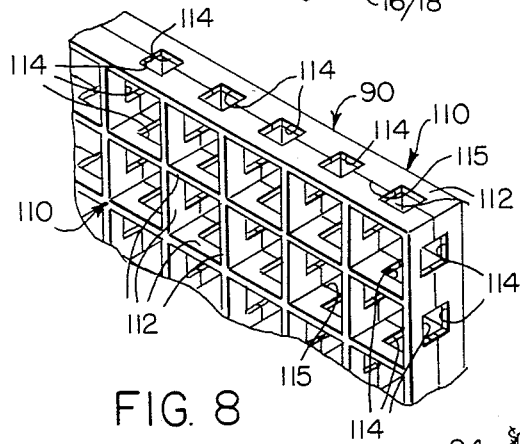
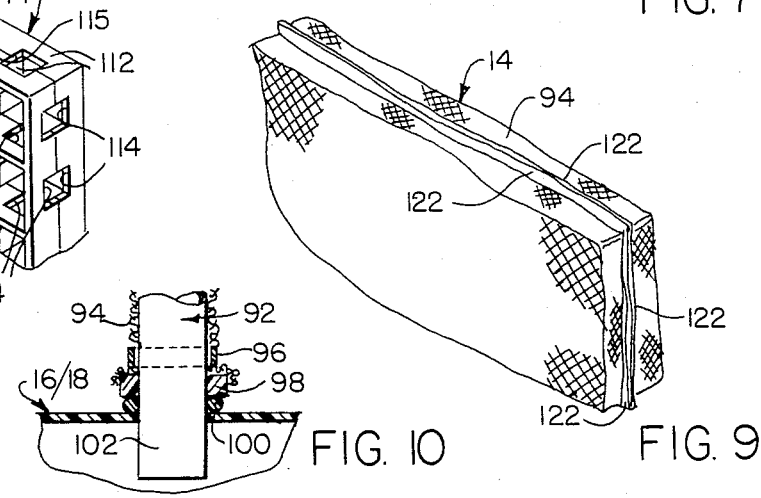
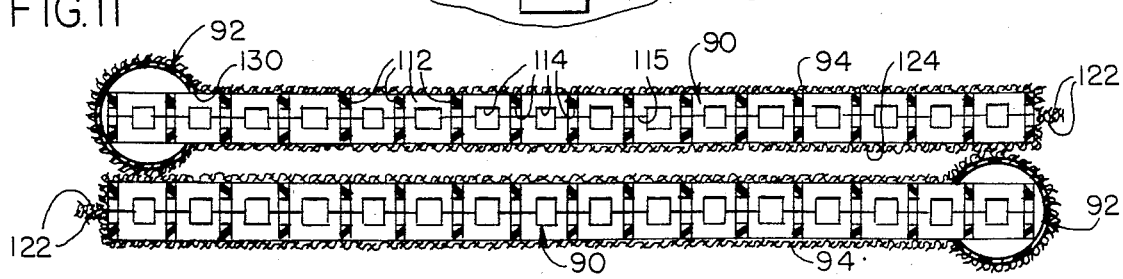

FILTER MACHINE

CROSS-REFERENCE TO RELATED APPLICATION

This application is related to my co-pending application Ser. No. 243,471 filed Mar. 13, 1981 for "Filter Machine", now abandoned.

BACKGROUND OF THE INVENTION

The invention relates to solid particle separation from liquids by filtering and more particularly to a leaf-type liquid filter machine capable of clarifying an exceptionally large volume of liquid and moving it in a generally continuously downwardly direction.

Leaf-type filters have generally been provided with liquid-input ports positioned within the plane of the filter elements or below them. A principal difficulty with this course of flow in filter machines is the flow interference with solids settling toward the bottom of the tank. A constant turbulence of liquid moving in an upwardly as well as a downwardly course makes it difficult for solids to reach the bottom of the filter machine, causing much of these solid particles to impinge and rapidly build up a cake upon the filter medium.

The need for an efficient high-flow filter machine has not heretofore been met, primarily because the concepts for such machines demonstate that the principles of liquid flow embodied in such machines are counter to the objects and purposes for which the machines were designed.

The improvement disclosed in this application relates particularly to the construction of the filter leaves or units and their adjacent spatial relationship.

SUMMARY OF THE INVENTION

The invention disclosed herein relates to a filter machine in which the effluent to be filtered is charged into the tank of the machine from above the filter leaves or units so that there is always a downward flow of polluted liquid and its contained solids from the input opening to the solids discharge portion of the machine.

The filtrate is obtained by means of a suction pump communicating with filter leaves whereby the flow into and through the filter medium is effected without severe or substantially any agitation of the effluent.

Another purpose and function of the instant invention is to continuously filter a very large volume of polluted liquid and simultaneously separate the solids therefrom for discharge to the settling tank portion of the machine. The suction pump is normally continuously in operation, on the clean side of the filter (debris is not pumped through it), to remove filtrate from the machine.

The relatively close spacing between and the side-by-side proximity of the filter units one with another is very important and this dimension is governed by the diameter of the filter medium covered discharge tube or conduit mounted on and at one end of the filter core panel. There is substantially zero flow of liquid below the filter units, allowing the solid particles to settle readily to the bottom of the filter tank.

The filter machine, in one form, is preferably made principally of an acrylic clear transparent plastic material. The machine can also be made of one or more of the polystyrenes or polyethylenes or their equivalents, depending upon the particular application in which the filter machine is to be used.

The plastic filter leaf core panels are of a unique design, permitting substantial flow of filtered liquid in vertical, horizontal and transverse directions, i.e. through all sides of the core panel, to a discharge conduit at one end thereof.

The filter leaf core panels are of very light weight and the filter leaves can be easily removed from the machine by merely picking them up from their positions of rest upon the supporting manifolds in the tank. No tools are required to remove the filter leaves or to service any part of the filter apart from the suction pump and its drive motor.

These and other objects, features and advantages of the invention will become more apparent by reference to the following detailed specification to be read in context with the attendant drawings.

BRIEF DESCRIPTION OF THE DRAWINGS

FIG. 6 is a perspective view of the filter leaf unit embodying the invention.

FIG. 7 is a slightly enlarged vertical sectional view taken substantially on the line 7—7 of FIG. 6.

FIG. 8 is a fragmentary slightly enlarged perspective view of a portion of the filter leaf core illustrated in FIGS. 6 and 7.

FIG. 9 is a fragmentary slightly enlarged perspective view of the filter cloth covered core illustrated in FIG. 6.

FIG. 10 is a fragmentary vertical sectional view of the coupling relationship of the core discharge conduit and the manifold communicating therewith.

FIG. 11 is a slightly enlarged horizontal sectional view taken substantially on the line 11—11 of FIG. 6.

DESCRIPTION OF THE PREFERRED EMBODIMENT

Figure 1:
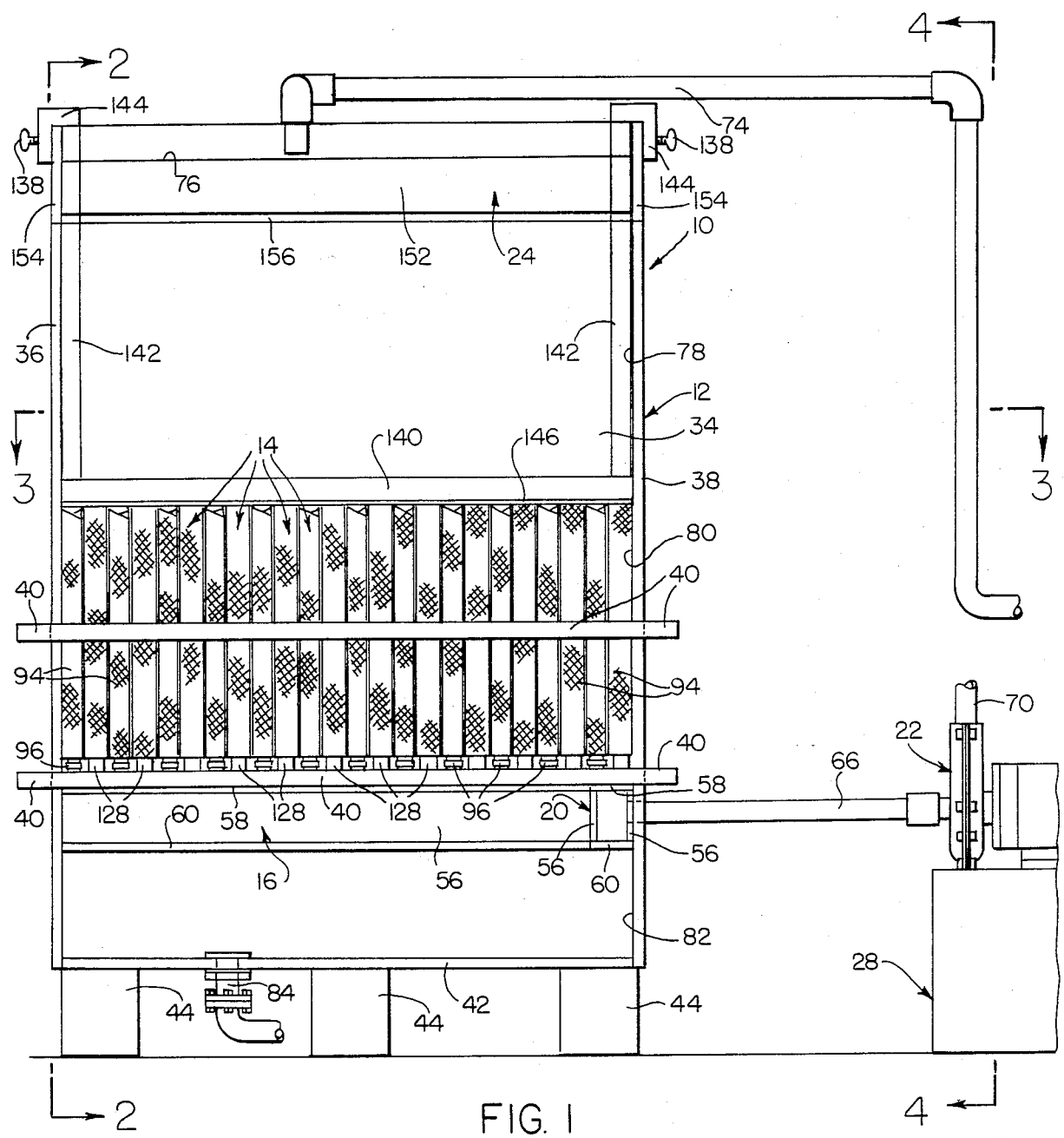
FIG. 1 is a side elevational view of a filter machine embodying the invention.

In a preferred embodiment of the invention, the filter machine 10 comprises the tank 12, the filter leaves 14, manifolds 16, 18 and 20 for the filter leaves, the motor drive suction pump 22, polluted liquid input trough 24, and the polluted liquid overflow discharge trough 26. A support 28 is provided for pump 22 and its drive motor. An auxiliary or supplementary tank 30 can associatedly be connected to and communicate with the filter tank to receive a portion of clean effluent and furnish a supply of liquid to flush any solid material floating on the surface of the input supply into the overflow discharge trough 26.

The tank 12 comprises the lateral side walls 34,34, the rear and front ends walls 36,38 respectively, the wall reinforcing bars 40 secured to the side and end walls and, at their ends, to each other, a bottom plate 42, transverse tank support bars (or tubes) 44, the polluted liquid input trough 24 and its adjacent liquid distributing plate 48, and the overflow discharge trough or chamber 26.

The above-described several components of the tank 12, in one preferred form, are and have been made of a clear, transparent acrylic plastic material, connected together in liquid tight relation with one another by suitable adhesive materials well known in the art. Visibility of the flow of polluted and filtered liquid in and through the machine is very desirable, and features of the instant filter machine lend themselves favorably to this advantage.

The lateral manifolds 16,18 and the connecting manifold 20 communicating therewith at the front end of the filter tank, in the form of square or rectangular cross-sectional tubes, each comprises lateral side walls 56, a top wall 58 and a bottom wall 60, all connected together at their contiguous edge portions with a suitable plastic adhesive material. The manifolds 16 and 18 are preferably formed into substantially rectilinear tubes closed at their rearward ends by the tank rear wall 36, and connected to and communicating laterally with the front end connecting manifold conduit 20. One of the lateral side walls 56 of each manifold is adhesively secured to one of the tank walls 34,34 or 38, and with manifolds 16 and 18 provide support for the filter units 14 at each end thereof. Of course, under some conditions one of the side walls 56 can be omitted and the edges of the top and bottom walls 58,60 can be adhesively secured to the inner surfaces of the tank side walls 34,34 to form the manifolds 16,18.

A plastic conduit 66 is threadedly connected at one end to the tank front wall 38 and the front end connecting manifold side wall 56 communicating with the latter manifold 20, and is connected at its opposite end to the input port of the suction pump 22.

The tank wall reinforcing bars or ribs 40 when made of clear transparent acrylic plastic material are adhesively secured to the tank walls 34,34,36 and 38 and to each other at their contiguous end portions to reinforce and stiffen the tank walls against displacement, cracking or rupture under the loads and stresses carried and experienced by those walls, when made of the same or similar plastic material.

The output conduit 70 connected to and communicating with the output or discharge port of the pump 22 can be connected to additional piping or conduit for any desirable use of the filtrate developed and discharged by the pump. For instance, the filtrate can be recirculated back to the tank 12 by way of the supplementary tank 30, as will be described hereinafter below.

Polluted input liquid to be filtered by the filter units 14 is provided by any suitable device or system, usually by a pump (not shown), drawing its contaminated liquid from any source and discharging it through conduit 74 into the tank input trough 24 from which it flows over the input weir 76 onto the liquid distributing plate 48 into the upper tank chamber 78 above the filter units 14.

The intermediate tank portion 80, in direct and full communication with the upper tank chamber 78 thereabove, contains the filter units 14 and the manifolds 16,18 and 20. A lower tank portion 82 in direct and full communication with the intermediate tank portion 80 is provided under the manifolds and filter leaves 14 for collection of solid particles that pass downwardly between the filter units 14 or fall from the filter media enwrapping them onto the tank bottom wall 42, for discharge from the drain outlet 84.

As shown more particularly in FIGS. 6–11 inclusive, each filter unit 14 comprises a core panel 90, a conduit 92 secured to and overlying and communicating with an edge portion of the core panel, a filter medium material 94, such for example as woven or non-woven filter cloth, paper or other suitable filtering material, a 2-piece split-type clamp ring 96 encircling the filter media about and upon the conduit wall, an annular stop ring 98 sealingly secured about and upon the conduit 92 under the clamp ring and filter media, and a resilient O-ring 100 disposed closely about and upon the conduit lower end portion 102 directly under the annular stop ring 98. The conduit lower end portion 102 passes through the close fitting opening 104 in the top wall 58 of the manifold 16 or 18, at which opening the O-ring 100 seals the filter unit against leakage thereinto. The 2-piece split-type plastic clamp ring is secured together and upon the filter media by suitable adhesive means well known in the art.

The filter core panel 90 is made of two facing complementary components 110,110 adhesively secured together. Each component has four egg-crate type ribs or walls 112 defining a transverse passageway therebetween. Each of the ribs 112 is notched or slotted at 114 at its inner edge 115, which faces and is adhered to the complementary facing edge 115 of the other component 110. Each facing edge 115 has similar facing ribs slotted at 114 in register with the ribs 112 of the complementary facing component 110 to provide four enlarged openings in the four ribs 112 defining the transverse passageways through the core components. These openings thus provide complete communication in all directions, i.e. transversely and longitudinally, horizontally and vertically, throughout the core, by way of and between the transverse passageways defined by the ribs 112, for liquid filtered through the filter medium 94 secured about the core panel 90, and through conduit 92 into the manifold 16 or 18.

The filter medium 94 is secured in proper filtering condition at edges of the filter core panel 90 by sewing the edges 122,122 of the medium together (FIGS. 9 and 11) or securing them adhesively together, or by applying heat and pressure upon these edges in overlapping relationship (FIG. 1), or by any other suitable means or process. Much depends upon the features, properties and nature of the filter medium used and that means for sewing the material together upon the core panel 90. As shown particularly in FIG. 11, the filter units 14 are arranged in staggered, adjacent abutting lateral relationship, the filter medium wrapped conduits abutting the medium wrapped core panels 90 at each side and at the distal ends thereof, leaving a very narrow passage 124 between them. Of course, as the outside diameter of conduit 92 increases, the passageway between adjacent medium-wrapped cores also increases.

The conduit 92 is provided with a slot 130 extending from one end thereof the height dimension of the core panel 90, the lower remaining end portion 102 thereunder being unslotted.

In order to maintain the filter leaves or units 14 level and even across the tank 12 from manifold to manifold, the distal free end of the units must be supported on rest pads 128 which, made of a suitable plastic material, are adhesively secured to and upon the upper walls 58 to the manifolds 16,18 in staggered spaced apart relationship, at a horizontal level substantially even with the proximal end support of the units 14 upon the O-rings 100.

As an assist to hold the filter units 14 in place on the manifolds 16,18 and to prevent their inadvertent rise from the manifolds, hold-down bars 134 are secured at their ends 136,136 by wing screws 138 to the end walls 36,38 of the tank 12. The hold-down bars, made of a suitable plastic material, comprise a medial web portion 140, upstanding end portions 142,142 and overhang portions 144,144 which extend outwardly and downwardly from the top free edge of the tank walls 36,38. The wing screws 138 are threadedly engaged with the overhang portions and the tank end walls to secure the filter units firmly upon the manifolds. A foam rubber or plastic strip 146 is secured to the longitudinal underside of the medial web portion 140 to engage the upper edges of the filter units 14 and hold them more uniformly in parallel spaced apart relationship. When filter units require replacement or maintenance, they can easily be removed and replaced, without tools, by disengaging the wing screws from the tank end walls and merely lifting the hold-down bars out of the way.

The polluted liquid input trough 24 comprises the outer side wall 152, end walls 154,154 and a bottom wall 156. The discharge end 158 of the input conduit 74 discharges the polluted liquid into the trough 24 from which it passes over weir 76 onto the liquid distributing plate 48 that extends the length of the tank between the front and rear end walls 38,36, respectively.

The overflow trough 26, outboard of the tank 12 as is the input trough 24, comprises an outer side wall 166, end walls 167,167, a bottom wall 168, a downwardly tapering funnel portion 170 and a discharge conduit 172 at the apex of the funnel portion, to receive and discharge solids and liquids that overflow the weir 174 at the entry of the overflow trough. Such material can be conducted to a waste chamber, or otherwise dealt with, depending upon the particular application for which the filter machine has been designed.

Figure 12:
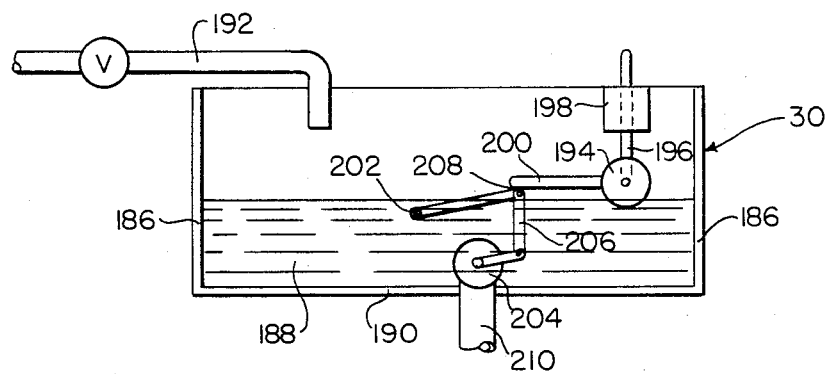
FIG. 12 is a vertical longitudinal sectional view taken through a supplementary tank serving to provide a continuous or intermittent supply of liquid from the suction pump to move floating solid particles by overflow into the upper discharge trough of the filter tank.
Figure 2:
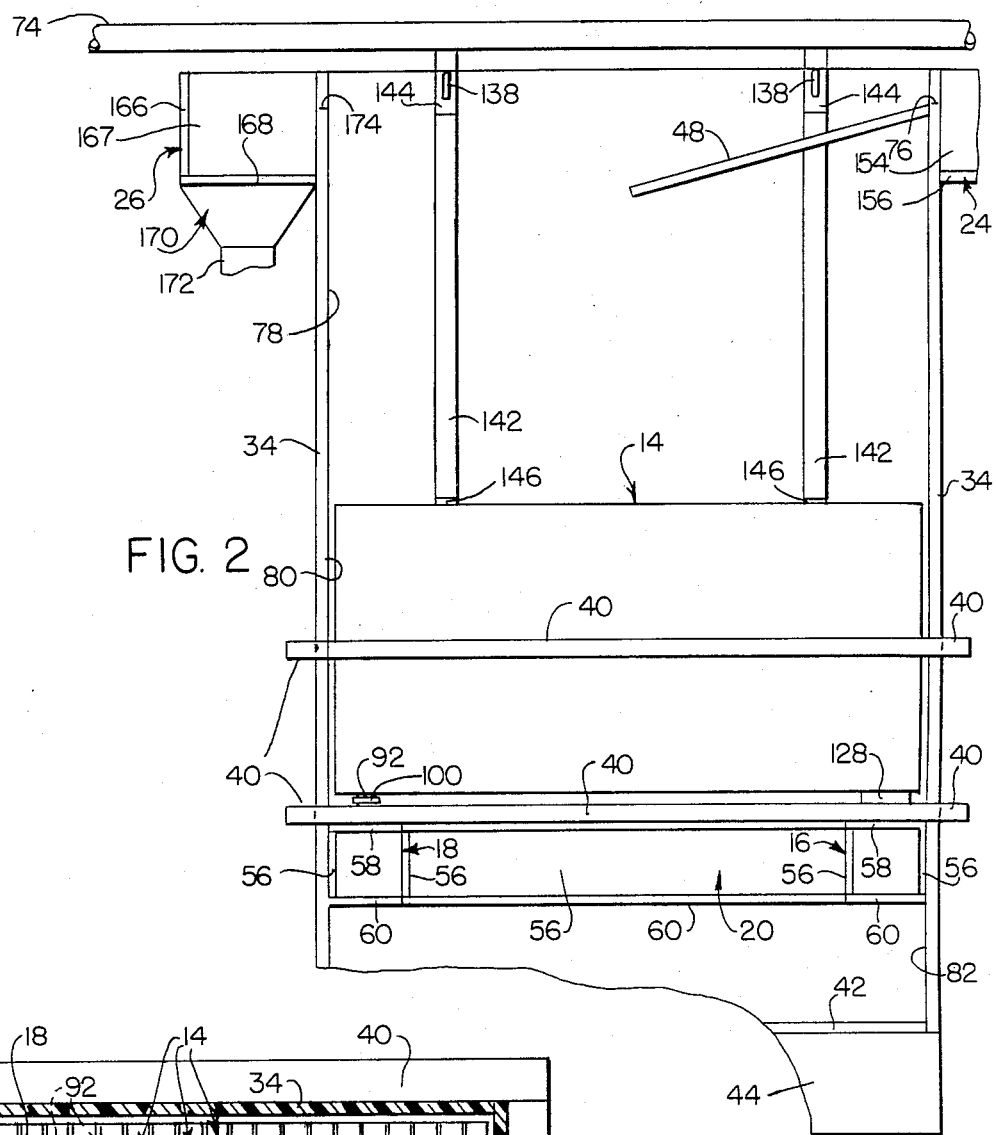
FIG. 2 is an end elevational view taken substantially on the line 2—2 of FIG. 1.
Figure 3:
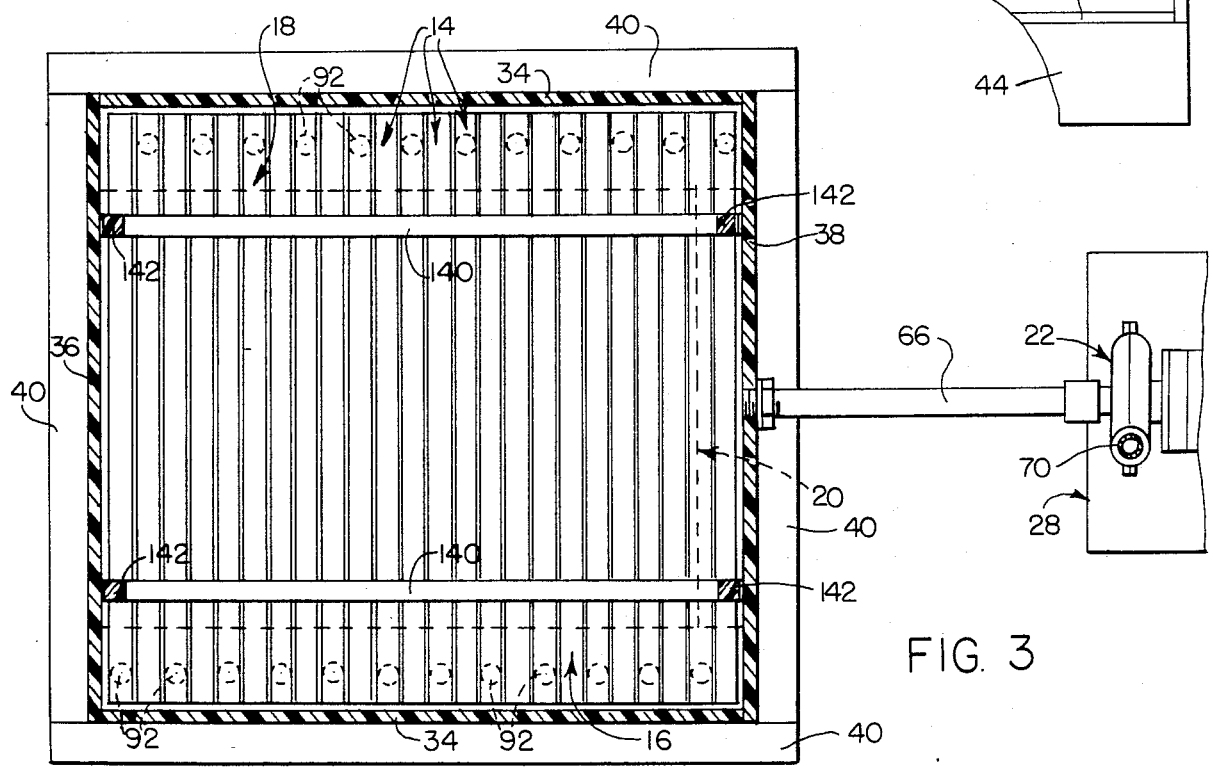
FIG. 3 is a horizontal sectional view taken substantially on the line 3—3 of FIG. 1, looking in the direction of the arrows.
Figure 4:
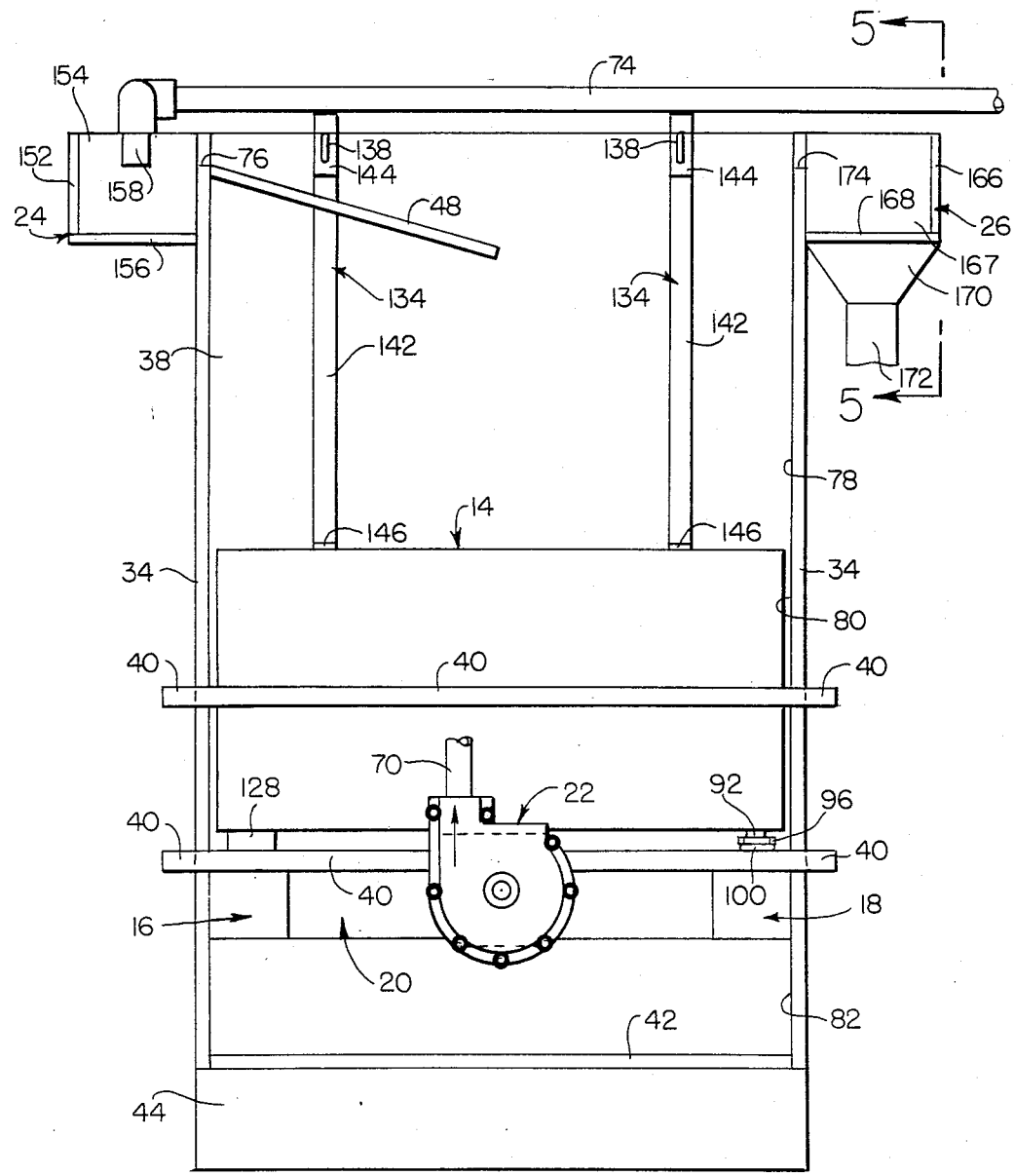
FIG. 4 is a front end elevational view taken substantially on the line 4—4 of FIG. 1.
Figure 5:
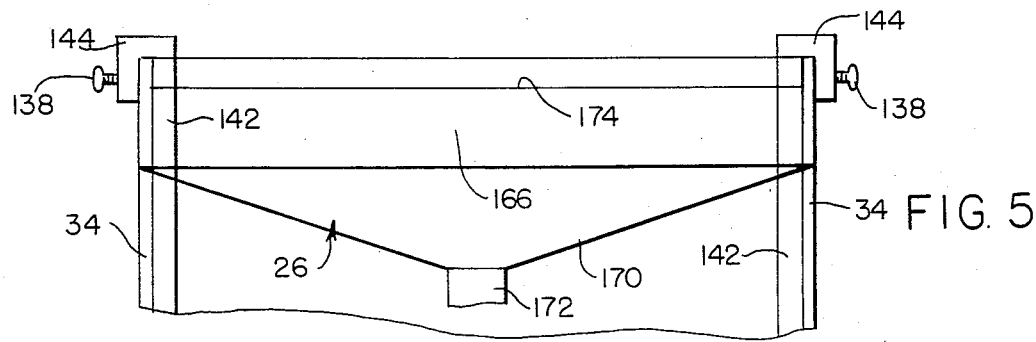
FIG. 5 is a fragmentary side elevational view taken substantially on the line 5—5 of FIG. 4.

The supplementary tank 30 (FIG. 12) is merely one form of liquid supply unit that can be used to maintain a relatively and substantially even level of liquid well above the filter units 14 in tank 12 when draining sludge from the tank, in order to avoid breaking the suction or negative pressure generated in the filter units 14 by the suction pump 22.

To remove floating debris and chunks of contaminants from the polluted input liquid and flush the same over weir 174 and into the overflow discharge trough 26, the supplementary clean liquid tank 30 is provided as one source of such clean liquid.

One form of the tank 30 comprises end walls 186,186, side walls 188,188, a bottom wall 190, a clean liquid input conduit 192, a float 194 guided by rod 196 in a bearing 198 mounted on the side wall(s) 188, a lever 200 pivotally mounted on the float and on the pivot pin 202, a valve 204 pivotally suspended by the lever 206 from lever 200 at 208, and a discharge conduit 210 communicating with the input trough 24 of tank 12 in any suitable way.

The clean liquid discharged from conduit 192 into tank 30 raises the float 194 to a predetermined high level, whereupon liquid is flushed through discharge conduit 210 in substantially the same manner as a water closet is flushed with a high-level float actuating the flush function. The liquid level in the upper chamber 78 of tank 12 is thus raised to the flushing level line for floating the solid contaminants into the overflow trough 26. The time interval for filling tank 30 to the flushing level is regulated by valve V in conduit 192 on a time-period basis, on a need-to-fill basis, or on any other suitable basis required by the conditions under which filtering by the machine 10 is needed. Preferably, there is a continuous overflow of polluted liquid into the overflow trough 26.

In one such filter machine 10, the core panel 90 of filter unit 14 is approximately $\frac{3}{4}''$ in thickness, by approximately 2 feet high, by approximately 4 feet long. The conduit 92 conducting filtrate liquid from the core panel 90 is approximately $1\frac{3}{8}''$ in diameter. Of course, the core panel 90 and conduit 92 can be made to other dimensions, observing the several features of construction described herein. Although the complementary core components 110,110 have been made of a polystyrene plastic material, these elements can also be made of aluminum, stainless steel, or other metal or plstic materials, depending upon the application in which the filter machine will be used.

The manifold tubes 16,18 and 20 reinforce the side and front tank walls 34,34 and 38 respectively, without any appreciable interference with the settling sludge or solid particles.

The filter cloth 94 or other medium, on each side and edge of the filter core panel 90, can readily be cleaned by hosing the cloth down with clean water or other suitable liquid by a jet stream of such liquid.

Both light and heavy particles, polluting the liquid to be filtered and clarified, are introduced at the top of tank 12. The downward velocity of the particles is such that the particles tend to settle directly to the bottom of the tank, from which they can be removed by any of a number of devices or systems well known in the art.

As has been stated above, the tank 12 and its complementary components are preferably made of clear acrylic plastic or equivalent materials. The filter unit core panel 90 and conduit are preferably made of a polystyrene, polyethylene, polyvinyl chloride resin or equivalent material. The supplementary tank 30 and its components may be made of a plastic or metal materials or combinations of the same, as is well known in the art.

It was found, after using pressure to hose down and wash the contaminants from the exterior surfaces of the filter leaf medium, that portions of the filter medium opened up at the sewing margins, where the sewing threads passed through the medium, sufficient to let solid particles pass therethrough. To avoid such fault or imperfection, the filter medium can be bonded together at margins of the core panel 90 and discharge conduit 92 by adhesives, or heat and pressure, or other suitable means depending upon the nature and properties of the filter medium.

Having disclosed certain preferred embodiments of the invention for purposes of explanation, further modifications or variations thereof, after study of this specification, will or may occur or become apparent to persons skilled in the art to which the invention pertains. Reference should be made to the appended claims in determining the scope of the invention.

I claim:

1. In a suction type filter machine having a tank to receive polluted liquids to be filtered or clarified and divided vertically into an upper open section, an intermediate filter leaves-containing section, and a lower solids-collection section, all sections being in free and open communication and connection with each other in a substantially vertical unitary chamber, the improvement in leaf-type filter units releasably connected to collecting manifolds, each unit comprising:

a core panel having transversely extending walls defining transverse liquid passageways therebetween, and openings through said walls defining means for communicating with and between said passageways;

a conduit permanently overlying and parallel to an edge and adjacent portions of said panel for collection, conduction and discharge of liquid filtrate from said core panel;

a filter medium enwrapping said core panel completely and said conduit substantially thereabout; and means for releasably connecting the conduit to a collecting manifold.

2. The improved leaf type filter units defined in claim 1, wherein said core panel is fabricated of a plastic material.

3. The improved leaf type filter units defined in claim 1, wherein said core panel is fabricated of a metallic material.

4. The improved leaf type filter units defined in claim 1, wherein said wall openings provide means for liquid flow longitudinally of and within said core panel, horizontally and vertically therethrough, from one edge of said core panel to the other vertically and horizontally.

5. The improved leaf type filter units defined in claim 1, wherein said filter medium comprises either woven or non-woven fabric material.

6. The improved leaf type filter units defined in claim 1, wherein said filter medium comprises a paper-type filter material.

7. The improved leaf type filter units defined in claim 5, wherein said filter medium is sewn at edges of said core panel and about said conduit.

8. The improved leaf type filter units defined in claim 1, wherein said filter medium is adhesively adhered at edges of said core panel and about said conduit.

9. The improved leaf type filter units defined in claim 5, wherein said filter medium is sealed at edges of said core panel and about said conduit to form liquid-tight edges thereabout.

10. The improved leaf type filter units defined in claim 6, wherein said filter medium is sealed at edges of said core panel and about said conduit to form liquid-tight edges thereabout.

11. The improved leaf type filter units defined in claim 1, wherein said core panel comprises a pair of side-by-side plastic components adhesively secured together, each said component embodying a portion of said openings through said transverse walls at the edges thereof abutting each other at the interface of said components.

12. The improved leaf type fiter units defined in claim 1, wherein said filter medium enwraps said conduit substantially except for a portion thereof adjacent its manifold connecting means.

13. In a suction type filter machine having a tank having a plurality of walls with open upper edges to receive liquid to be filtered or clarified, said tank being divided vertically into an upper open section, an intermediate filter-leaves containing section and a lower solids-collecting section, all sections being in free and open communication and connection with each other in a substantially vertical unitary chamber, the improvement in said intermediate filter-leaves containing section comprising:

a plurality of filter leaves arranged in parallel, staggered contiguous relationship, each filter leaf having a conduit overlying and parallel to one edge and an adjacent portion of the leaf;

first and second manifolds at each lateral side of said tank in parallel spaced apart alignment supporting said filter leaves thereon;

the conduits each perpendicularly attached to a manifold such that the filter leaf conduit connections alternate between the first and second manifolds; and a connecting manifold communicating with said first and second manifolds at one end thereof to receive filtrate therefrom.

14. The improved intermediate section defined in claim 13, wherein said manifolds are fabricated of a plastic material.

15. The improved intermediate section defined in claim 13, wherein said manifolds lie substantially in the same plane.

16. The improved intermediate section defined in claim 15, wherein said filter leaves, connected alternately to said first and second manifolds, lie substantially in the same plane, the first and second manifolds further including a plurality a leveling blocks mounted on said manifolds at a position capable of receiving the distal ends of said filter leaves to elevate and maintain said filter leaves in a horizontally level attitude.

17. The improved intermediate section defined in claim 13, wherein said filter leaves each comprises:

a core panel having transversely extending walls defining transverse liquid passageways therebetween, openings through said walls defining means for communicating with and between said passageways;

a conduit overlying an edge and adjacent portions of said panel for collection, conduction and discharge of liquid filtrate from said core panel to the first and second manifolds; and a filter medium enwrapping said core panel completely and said conduit substantially thereabout.

18. The improved intermediate section defined in claim 17, further comprising:

means for maintaining the filter leaves in conjunction and communication with the first and second manifolds, such means including a plurality of elongated hold-down bars, the bars having upstanding end portions with first and second ends which extend from the intermediate section to the top free edge of the tank walls, the first end of the upstanding end portion having an overhang portion extending outwardly and downwardly over the top free edge of the tank wall, means for releasably fastening the overhang portion to the tank and a medial web portion extending laterally from the second end of the upstanding end portions over the filter leaves to communicate with the lower end of an unstanding end portion positioned on the opposite tank wall in a manner perpendicular to the filter leaves.

19. The improved intermediate section defined in claim 13, wherein
said tank walls are made of a substantially clear, transparent material permitting continuous monitoring of the flow of each individual filter leaf.

20. The improved intermediate section defined in claim 13, wherein the unsupported lateral edges of each filter leaf abuttingly and sealingly engage the adjacent manifold.

* * * * *